(12) United States Patent
Masuko

(10) Patent No.: US 10,432,901 B2
(45) Date of Patent: Oct. 1, 2019

(54) CONTENT PROJECTION CONTROL APPARATUS, CONTENT PROJECTION CONTROL METHOD AND PROGRAM

(71) Applicant: Rakuten, Inc., Tokyo (JP)

(72) Inventor: Soh Masuko, Tokyo (JP)

(73) Assignee: Rakuten, Inc., Tokyo (JP)

(*) Notice: Subject to any disclaimer, the term of this patent is extended or adjusted under 35 U.S.C. 154(b) by 0 days.

(21) Appl. No.: 16/069,885

(22) PCT Filed: Jan. 15, 2016

(86) PCT No.: PCT/JP2016/051191
§ 371 (c)(1),
(2) Date: Dec. 12, 2018

(87) PCT Pub. No.: WO2017/122363
PCT Pub. Date: Jul. 20, 2017

(65) Prior Publication Data
US 2019/0124306 A1 Apr. 25, 2019

(51) Int. Cl.
*H04N 9/31* (2006.01)
*G09G 5/00* (2006.01)
(Continued)

(52) U.S. Cl.
CPC ......... *H04N 9/3179* (2013.01); *G06K 9/3241* (2013.01); *G09G 5/00* (2013.01);
(Continued)

(58) Field of Classification Search
None
See application file for complete search history.

(56) References Cited

U.S. PATENT DOCUMENTS 8,723,787 B2* 5/2014 Jung .................... G06F 3/03
345/156
2006/0181685 A1* 8/2006 Hasegawa ............ G03B 37/04
353/69
(Continued)

FOREIGN PATENT DOCUMENTS

JP 2004-077516 A 3/2004
JP 2011-008111 A 1/2011
(Continued)

OTHER PUBLICATIONS

English Translation of International Search Report for PCT/JP2016/051191 dated Mar. 22, 2016.

*Primary Examiner* — Jeffery F Harold
*Assistant Examiner* — Mustafizur Rahman
(74) *Attorney, Agent, or Firm* — HEA Law PLLC

(57) ABSTRACT

To prevent visibility of content from being partially lowered due to existence of a projection unsuitable area while effectively utilizing a projection suitable area. Provided is a content projection control method including the steps of obtaining content data indicating content including a plurality of objects, each object including one or more images or a plurality of characters, obtaining projection area data indicating a projection area, determining a projection unsuitable area, which is not suitable for projection in the projection area, based on the projection area data, generating a plurality of arrangement units from the content indicated by the content data, each arrangement unit including one object or a plurality of adjacent objects, and changing a layout of the arrangement units by determining a projection position of each arrangement unit based on a position of the projection unsuitable area.

11 Claims, 13 Drawing Sheets

(51) Int. Cl.
*G09G 5/14* (2006.01)
*H04N 5/74* (2006.01)
*G06K 9/32* (2006.01)
*H04N 21/232* (2011.01)

(52) U.S. Cl.
CPC ............... *G09G 5/14* (2013.01); *H04N 5/74* (2013.01); *H04N 9/3194* (2013.01); *H04N 21/232* (2013.01)

(56) References Cited

U.S. PATENT DOCUMENTS

| | | | | |
|---|---|---|---|---|
| 2013/0107021 A1* | 5/2013 | Maizels | ............... | G06T 19/006 348/50 |
| 2013/0141646 A1* | 6/2013 | Tanaka | ............... | H04N 9/31 348/569 |
| 2013/0155308 A1* | 6/2013 | Wu | ............... | G06T 3/00 348/333.05 |
| 2013/0174035 A1* | 7/2013 | Grab | ............... | H04N 21/4316 715/716 |
| 2013/0279761 A1* | 10/2013 | Tytgat | ............... | G06T 7/246 382/107 |
| 2014/0047367 A1* | 2/2014 | Nielsen | ............... | G06F 3/04845 715/767 |
| 2015/0062434 A1* | 3/2015 | Deng | ............... | H04N 5/45 348/565 |
| 2015/0130912 A1* | 5/2015 | Fisher | ............... | H04N 5/4403 348/552 |
| 2015/0208047 A1 | 7/2015 | Kojima | | |
| 2015/0244998 A1* | 8/2015 | Yanazume | ............ | H04N 9/3185 348/38 |
| 2016/0156884 A1* | 6/2016 | Toyama | ............. | G05B 15/02 348/744 |
| 2018/0091702 A1* | 3/2018 | Oba | ............. | G02B 27/017 |

FOREIGN PATENT DOCUMENTS

| | | |
|---|---|---|
| JP | 2013-148868 A | 8/2013 |
| JP | 2015-139004 A | 7/2015 |
| WO | 2015-111158 A1 | 7/2015 |

* cited by examiner (a)

(b)

(c)

(d)

(e)

CONTENT PROJECTION CONTROL APPARATUS, CONTENT PROJECTION CONTROL METHOD AND PROGRAM

CROSS REFERENCE TO RELATED APPLICATIONS

This application is a National Stage of International Application No. PCT/JP2016/051191 filed on Jan. 15, 2016. The contents of the above document is incorporated herein by reference in its entirety.

TECHNICAL FIELD

The present invention relates to a content projection control apparatus, a content projection control method, and a program, and in particular to techniques for preventing content from being partially invisible due to a projection unsuitable area.

BACKGROUND ART

When using a content projection apparatus, such as a projector, expected visibility can be achieved if content is projected on a special projection screen including a flat light reflecting surface colored with a single color, such as white. In recent years, brightness of content projection apparatus has been increased, and thus content is often projected on a surface other than a special projection screen, such as a wall of a room. This type of usage enables a plurality of people to enjoy content together.

However, a projection surface other than a special projection screen, such as a wall of a room, sometimes includes members unsuitable for projection. For example, such a surface may include equipment such as a clock and a calendar, or connecting members of wall panels. This may create an area that is not suitable for projecting content (projection unsuitable area). If content is partially projected onto the projection unsuitable area, the visibility of the content in that portion may be lowered. In this regard, in the invention described in Patent Literature 1, the entire content is horizontally or vertically divided into two halves, and the divided pieces of content are placed above and below, or left and right of the projection unsuitable area.

CITATION LIST

Patent Literature

Patent Literature 1: JP2015-139004A

SUMMARY OF INVENTION

Technical Problem

However, according to the invention described in the Patent Literature 1, the divided pieces of content are only separately placed above and below or left and right of the projection unsuitable area so as to sandwich the projection unsuitable area. As such, an area in the projection area other than the projection unsuitable area, i.e. a projection suitable area, cannot be effectively utilized unless it is a special case where the projection unsuitable area extends horizontally or vertically in a belt-shaped manner in the projection area.

One or more embodiments of the present invention have been conceived in view of the above, and an object thereof is to provide a content projection control apparatus, a content projection control method, and a program capable of preventing visibility of content from being partially lowered due to a projection unsuitable area while effectively utilizing a projection suitable area.

Solution to Problem

A content projection control apparatus according to the present invention includes content data obtaining means for obtaining content data indicating content including a plurality of objects, each object including one or more images or a plurality of characters, projection area data obtaining means for obtaining projection area data indicating a projection area, projection unsuitable area determining means for determining a projection unsuitable area, which is not suitable for projection in the projection area, based on the projection area data, arrangement unit generating means for generating a plurality of arrangement units from the content indicated by the content data, each arrangement unit including one object or a plurality of adjacent objects, and layout changing means for changing a layout of the arrangement units by determining a projection position of each arrangement unit based on a position of the projection unsuitable area.

A content projection control method according to the present invention includes obtaining content data indicating content including a plurality of objects, each object including one or more images or a plurality of characters, obtaining projection area data indicating a projection area, determining a projection unsuitable area, which is not suitable for projection in the projection area, based on the projection area data, generating a plurality of arrangement units from the content indicated by the content data, each arrangement unit including one object or a plurality of adjacent objects, and changing a layout of the arrangement units by determining a projection position of each arrangement unit based on a position of the projection unsuitable area.

A program according to the present invention causes a computer to function as content data obtaining means for obtaining content data indicating content including a plurality of objects, each object including one or more images or a plurality of characters, projection area data obtaining means for obtaining projection area data indicating a projection area, projection unsuitable area determining means for determining a projection unsuitable area, which is not suitable for projection in the projection area, based on the projection area data, arrangement unit generating means for generating a plurality of arrangement units from the content indicated by the content data, each arrangement unit including one object or a plurality of adjacent objects, and layout changing means for changing a layout of the arrangement units by determining a projection position of each arrangement unit based on a position of the projection unsuitable area. The program may be stored in a computer-readable information storage medium, such as a semiconductor memory, a magnetic disk, and an optical disc.

DESCRIPTION OF EMBODIMENTS

The content projection control apparatus according to embodiments of the present invention will be described below in detail with reference to the accompanying drawings.

Figure 1:
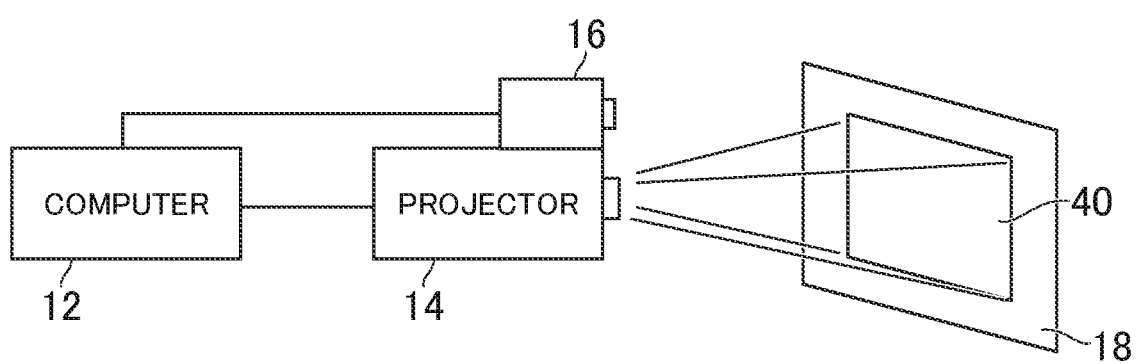
FIG. 1 is a diagram illustrating a system configuration of a content projection control apparatus according to an embodiment of the present invention.

FIG. 1 is a diagram illustrating a system configuration of the content projection control apparatus according to this embodiment. The content projection control apparatus is mainly composed of a computer 12, such as a personal computer, a smartphone, and a tablet computer, and the computer 12 is connected to a camera 16 and a projector 14, which is a content projection apparatus. The computer 12 includes a CPU and a memory, and performs a variety of information processing according to the present invention when the CPU executes a computer program. The computer program may be read from a computer-readable information storage medium, such as a magnetic disk, an optical disc, and a semiconductor memory, to the computer 12. Alternatively, the computer program may be downloaded from a communication network, such as the Internet.

The projector 14 visualizes data of content provided by the computer 12, and projects the content on a projection surface, such as a special projection screen or a wall. Here, a part of a wall 18 of a room is set to a projection area 40 of the content, and the projector 14 projects the content on the projection area 40. A camera 16 captures the projection area 40 of the wall 18, and provides the captured data to the computer 12. The computer 12 uses the captured data to determine a projection suitable area and a projection unsuitable area in the projection area 40. One or both of the projector 14 and the camera 16 may be installed in the computer 12.

Figure 2:
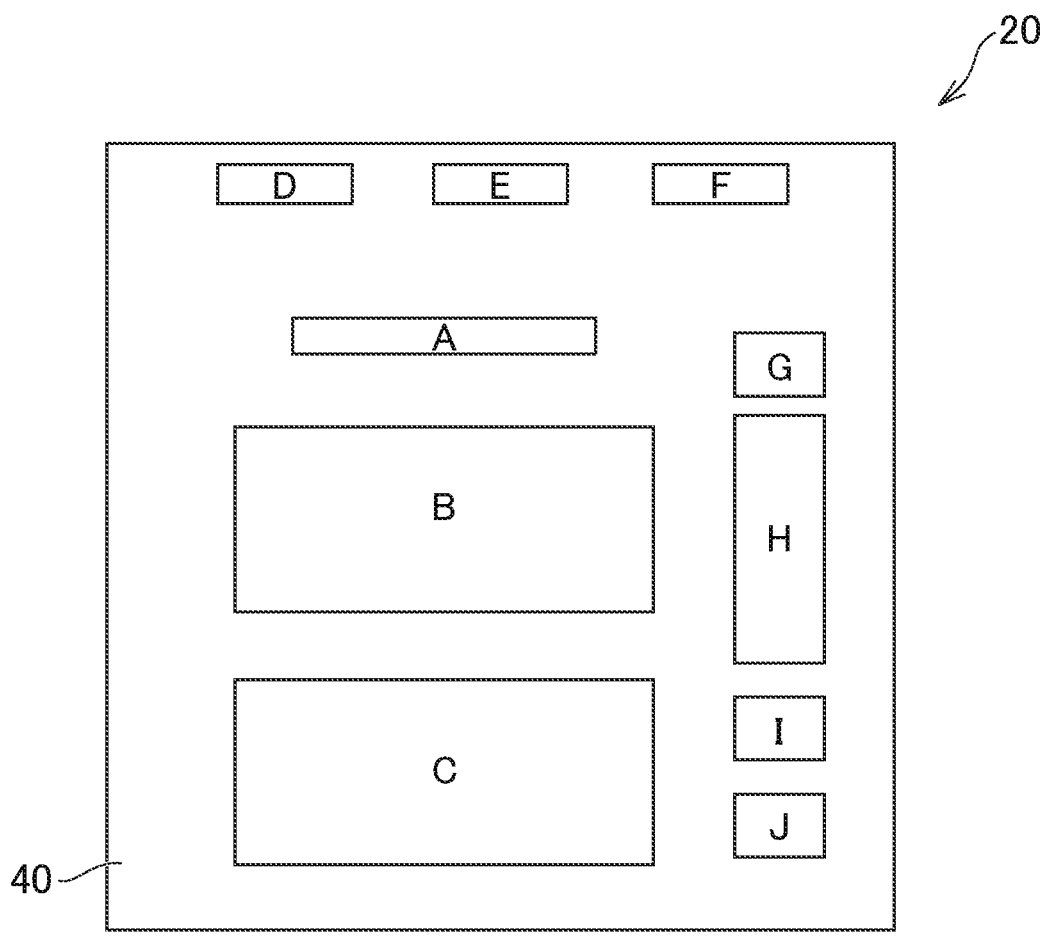
FIG. 2 is a diagram illustrating an example of content projected on a wall by the content projection control apparatus according to an embodiment of the present invention.

FIG. 2 is a diagram illustrating an example of content projected on the wall 18 by the content projection control apparatus according to the present invention. The content 20 is, for example, a newspaper article and a presentation material, and described by content data in vector graphics format, such as HTML format and PowerPoint (registered trademark) format. The computer 12 renders the content data in vector graphics format, thereby obtaining data (image data) in raster format.

The content 20 includes objects A to J, and the content data indicates each object's content, attribute, and display control information (e.g., display position, display font, output size). Each of the objects A to J includes at least one image or a plurality of characters. Typically, the objects A to J include texts, images, or combinations of texts and images.

The attributes of the objects A to J may be element types in the content, such as "title" and "main text." Regarding an object for specific purpose, such as a banner advertising image, the attribute may be purpose such as "advertisement."

Here, the attribute of the object A is "title", and the attribute of the objects B and C is "main text." The attribute of the objects D to F and G to J is "advertisement." In this embodiment, priorities are set for the attributes of the objects. "Title" has the highest priority, "main text" has the second highest priority, and "advertisement" has the lowest priority.

Figure 3:
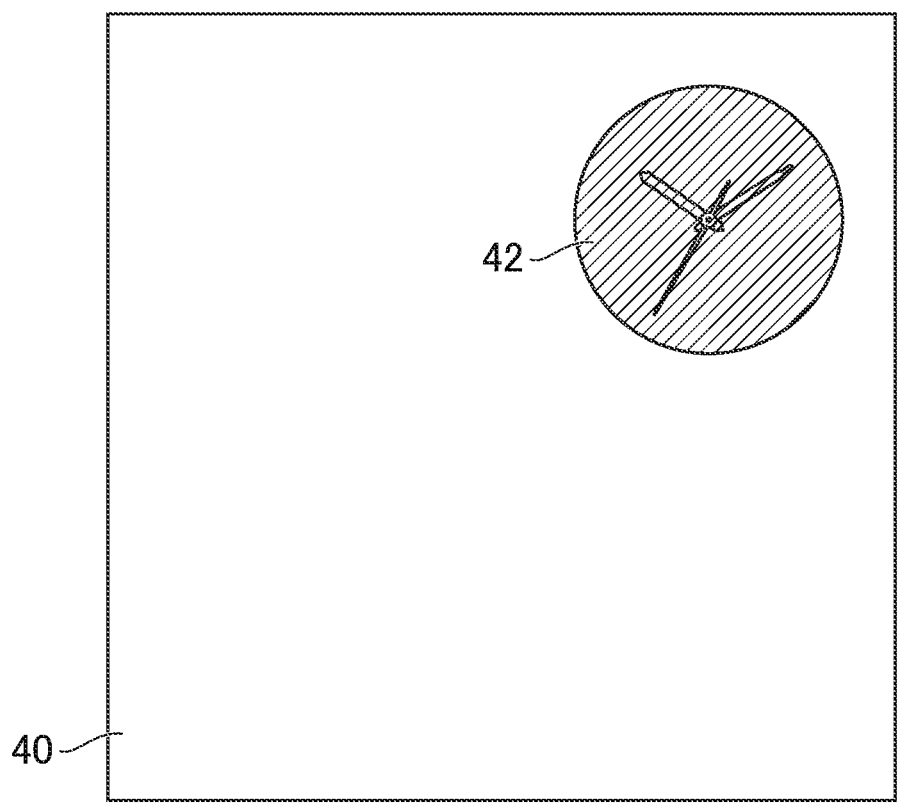
FIG. 3 is a diagram illustrating an example of the wall on which the content is projected by the content projection control apparatus according to an embodiment of the present invention.

FIG. 3 is a diagram illustrating an example of the wall 18 on which the content 20 is projected by the content projection control apparatus according to this embodiment. As shown in FIG. 3, equipment 42, such as a clock, is placed on the upper right corner of the projection area 40 of the wall 18. As such, the content 20 cannot be satisfactorily projected on the equipment 42. According to this embodiment, the layout of the content 20 shown in FIG. 2 is changed so that the positions of the objects A to J of the content 20 are rearranged in order to avoid the equipment 42.

Figure 4:
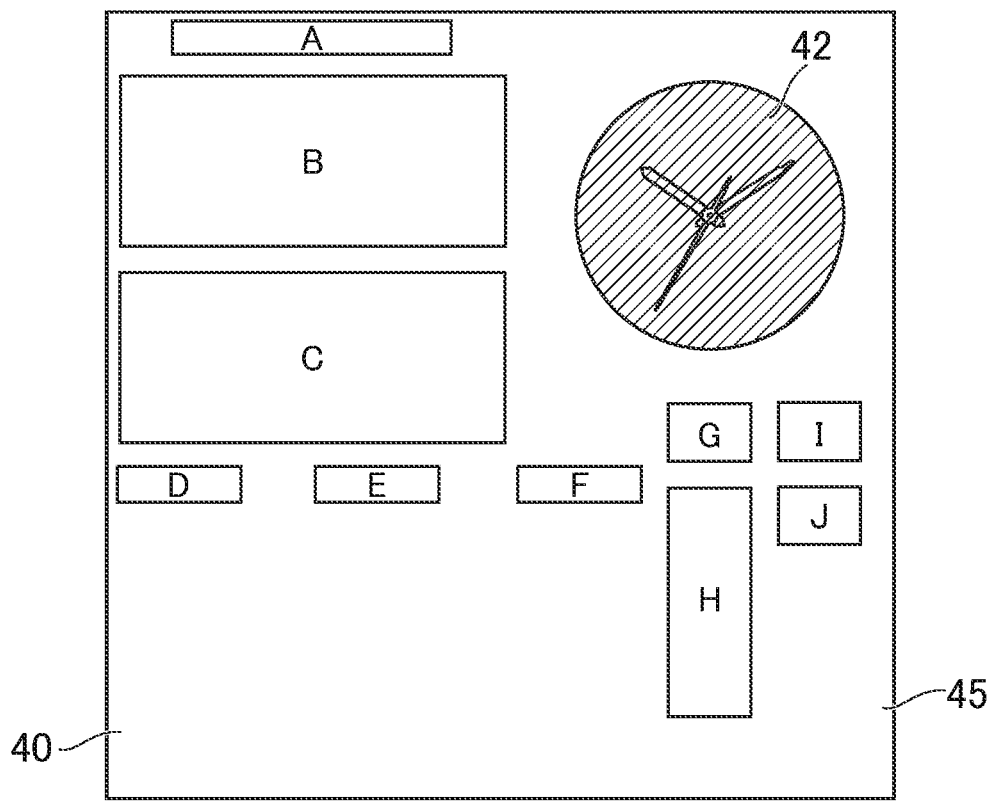
FIG. 4 is a diagram illustrating the content projected on the wall shown in FIG. 3, after the layout of the content shown in FIG. 2 is changed by the content projection control apparatus according to an embodiment of the present invention.

FIG. 4 is a diagram illustrating the content 20 projected on the wall 18 shown in FIG. 3, after the layout of the content 20 shown in FIG. 2 is changed by the content projection control apparatus according to this embodiment. As described, according to this embodiment, by making substantial changes to the layout of the content 20, the area in the projection area where the equipment 42 is not placed can be effectively utilized so as to project the objects A to J.

Figure 5:
FIG. 5 is a diagram illustrating arrangement units generated from the content shown in FIG. 2.
Figure 5:
Figure 5:
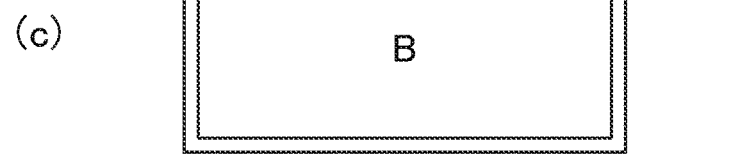
Figure 5:
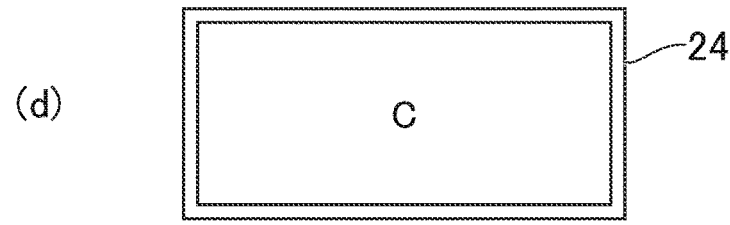
Figure 5:
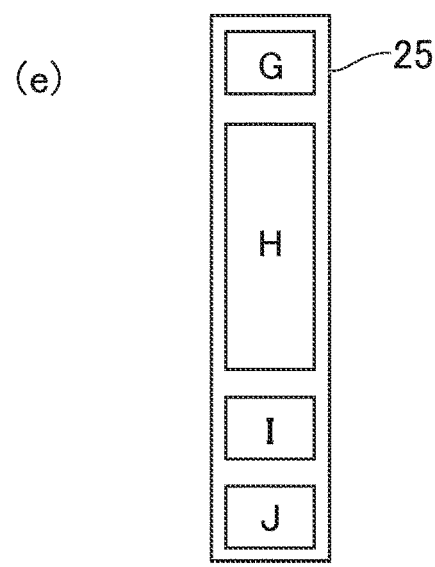

In order to change the layout of the content 20 in this way, the computer 12 generates arrangement units 21 to 25 shown in FIG. 5 (a) to (e) from the content 20. Here, the arrangement unit 21 shown in FIG. 5 (a) includes the objects D to F, which are three advertisement images arranged side by side in the original content 20. The arrangement unit 22 shown in FIG. 5 (b) includes the object A, which is a title image. The arrangement unit 23 shown in FIG. 5 (c) includes the object B, which is a text object indicating a portion of the main text. Similarly, the arrangement unit 24 shown in FIG. 5 (d) includes the object C, which is a text object indicating another portion of the main text. The arrangement unit 25 shown in FIG. 5 (e) includes the objects G to J, which are four advertisement images arranged vertically side by side in the original content 20. In other words, each of the arrangement units 21 to 25 includes one object or a plurality of objects arranged vertically or horizontally side by side.

The arrangement units 21 to 25 are generated by the computer 12 as data in raster format, for example. As described above, the computer 12 renders the content data in vector graphics format, thereby obtaining data of the content 20 in raster format. At this time, the computer 12 obtains data of the arrangement units in raster format based on display control information of each object included in the content data. For example, the computer 12 may cut a portion of data of the entire content in raster format using display control information of each object so as to obtain data of the arrangement units in raster format. Alternatively, only a portion corresponding to one arrangement unit may be rendered in the content data in vector graphics format so as to obtain data of the object in raster format. The arrangement units 21 to 25 may be generated as data in vector graphics format by editing the content data in vector graphics format.

Figure 6:
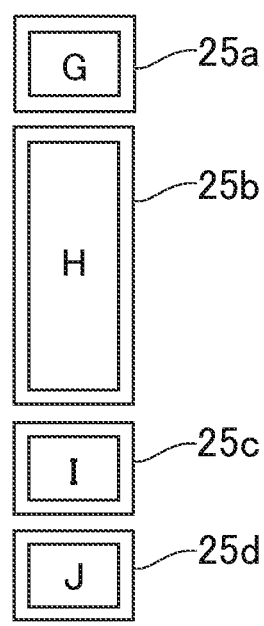
FIG. 6 is a diagram illustrating arrangement units generated by further dividing the arrangement units shown in FIG. 5 (e)

FIG. 6 is a diagram illustrating arrangement units 25a to 25d, which are generated by further dividing the arrangement unit 25 shown in FIG. 5 (e). As shown in FIG. 4, the arrangement unit 25, in which the objects G to J are vertically aligned, cannot be projected below the equipment 42 as it is. As such, in this embodiment, the arrangement unit 25 shown in FIG. 5 (e) is divided into the arrangement units 25a to 25d shown in FIG. 6 to be arranged in two rows as shown in FIG. 4.

Figure 7:
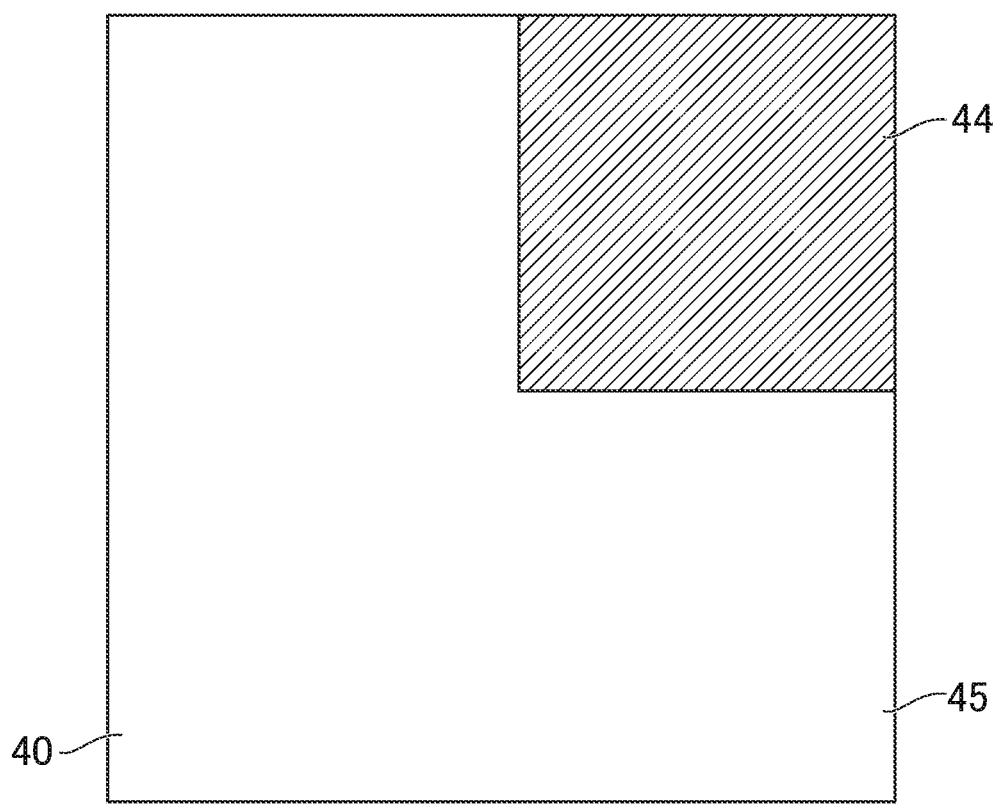
FIG. 7 is a diagram illustrating a projection unsuitable area and a projection suitable area on the wall shown in FIG. 3.

Here, determination of a projection unsuitable area and a projection suitable area in the projection area 40 will be described. FIG. 7 is a diagram illustrating a projection unsuitable area 44 and a projection suitable area 45 in the projection area 40 of the wall 18 shown in FIG. 3. As shown in FIG. 7, the position of the equipment 42 is determined as the projection unsuitable area 44, and the rest of the area is determined as the projection suitable area 45. The computer 12 captures an image of the projection area 40 by the camera 16, and determines the projection unsuitable area 44 and the projection suitable area 45 from the captured data. For example, a known pattern image is projected on the projection area 40 and captured. The known pattern image is, for example, an image in which a lot of known marks, such as a cross, are arranged. The edge extracting process is performed for the captured data so as to generate a processed captured image. The edge extracting process is also performed for the original pattern image so as to generate a processed original pattern image. The projection area 40 is then divided into a plurality of block areas, and for each block area, a difference between the processed captured image and the processed original pattern image is calculated. A block area in which a difference is a threshold value or more is determined as a projection unsuitable area 44, and a block area in which a difference is less than the threshold value is determined as a projection suitable area 45.

Instead of using the pattern image, an image of the content 20 can also be used to determine the projection unsuitable area 44 and the projection suitable area 45. This eliminates the need of projecting the pattern image on the projection area 40.

Further, the camera 16 captures an image of the projection area 40 on which nothing is projected or an image without a pattern is projected, the projection unsuitable area 44 and the projection suitable area 45 can be readily determined based on the captured image thus obtained. That is, edge extracting process is performed on the captured image, and the number of pixels indicating edge is counted for each block area. If the number of pixels is equal to or more than a threshold value, a block area is determined as a projection unsuitable area 44, and if the number of pixels is less than the threshold value, a block area is determined as a projection suitable area 45.

If the camera 16 includes distance measuring means and can obtain a distance between the camera 16 and a subject, a shape of the wall 18 as a subject is determined based on the distance, and the projection unsuitable area 44 and the projection suitable area 45 may be determined based on the determined shape. That is, an area on which the equipment 42, such as a clock, is positioned protrudes forward, and thus such an area may be determined as the projection unsuitable area 44.

Figure 8:
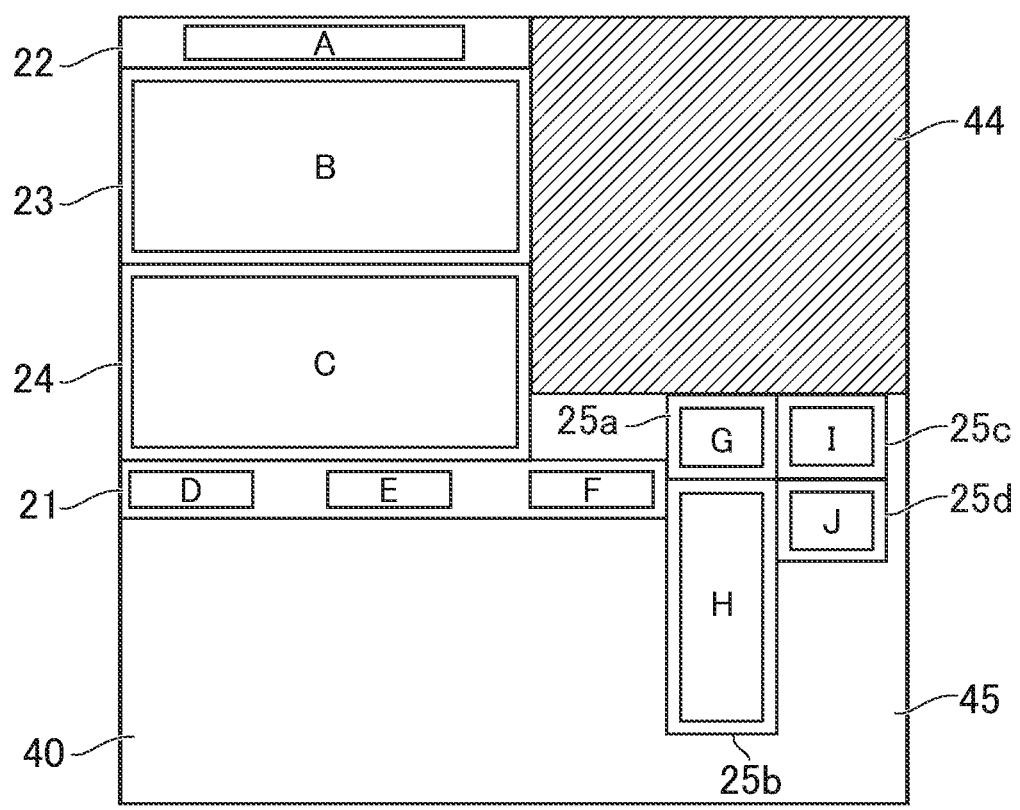
FIG. 8 is a diagram illustrating an example of the arrangement units placed in the projection suitable area shown in FIG. 7.

FIG. 8 is a diagram illustrating an example of the arrangement units 21 to 24 and 25a to 25d arranged in the projection suitable area 45 shown in FIG. 7. In this embodiment, priorities are set for the arrangement units 21 to 25. Priorities are calculated based on the attributes of the objects included in the arrangement units and average values of projection sizes of the objects included in the arrangement units. For example, priorities of attributes assigned to objects included in an arrangement unit are averaged, and a priority of the arrangement unit is set to be higher as the average value is higher. The attributes assigned to the objects may be obtained from the content data. Further, original projection sizes of objects included in an arrangement unit are averaged, and a priority of the arrangement unit is set to be higher as the average value is higher. In this way, an arrangement unit including an object having a relatively larger original projection size is assigned with a higher priority. The original projection sizes of the objects may also be obtained from the content data. If output history of each object being projected or displayed is stored in the computer 12, for example, the greater the number of times that an object is projected or displayed, the higher priority may be assigned to the object, and the priority of the arrangement unit including such an object may be lowered.

The projection suitable area 45 is an L-shaped area in which the arrangement units 21 to 24 and 25a to 25d are arranged in descending order of priority. Here, the priority is set in this order: the arrangement unit 22 including the object A that is assigned with the attribute of "title" having the highest priority; the arrangement units 23 and 24 respectively including the objects B and C that are assigned with the attribute of "main text" having the second highest priority and have the large projection sizes respectively; and the arrangement units 21 and 25 respectively including the objects D to F and G to J that are assigned with the attribute of "advertisement" having the lowest priority and have the small projection sizes respectively. As such, a projection position of the arrangement unit 22 is determined first. The arrangement unit 22 is moved up, down, left or right in the projection suitable area 45, and reduced accordingly so as to be projected on different positions. The position having the highest arrangement evaluation value E is then determined to a projection position. That is, the arrangement evaluation value E is defined as a function that satisfies the conditions: 1) the greater the distance between an original position of an arrangement unit and a new position is, the smaller the arrangement evaluation value E becomes; 2) the smaller the reduction ratio that is applied when the arrangement unit is placed on a projection position is, the smaller the arrangement evaluation value E becomes; and 3) the closer the arrangement unit is placed to the upper left in the projection suitable area 45, the greater the arrangement evaluation value E becomes. In view of this, the arrangement unit 22 is placed at the upper left of the projection suitable area 45, and the arrangement units 23 and 24 are placed below the arrangement unit 22 in order. The arrangement unit 21 is placed below the arrangement units 23 and 24. Subsequently, the arrangement unit 25 is divided into the arrangement units 25a to 25d, because the arrangement unit 25 cannot be placed in the right side of the arrangement unit 21, i.e. below the projection unsuitable area 44. The arrangement units 25a to 25d are then placed in two rows below the projection unsuitable area 44. As a result of the processing described above, as shown in FIG. 4, the content 20 in which the layout is changed so as to avoid the equipment 42 is displayed on the wall 18.

Figure 9:
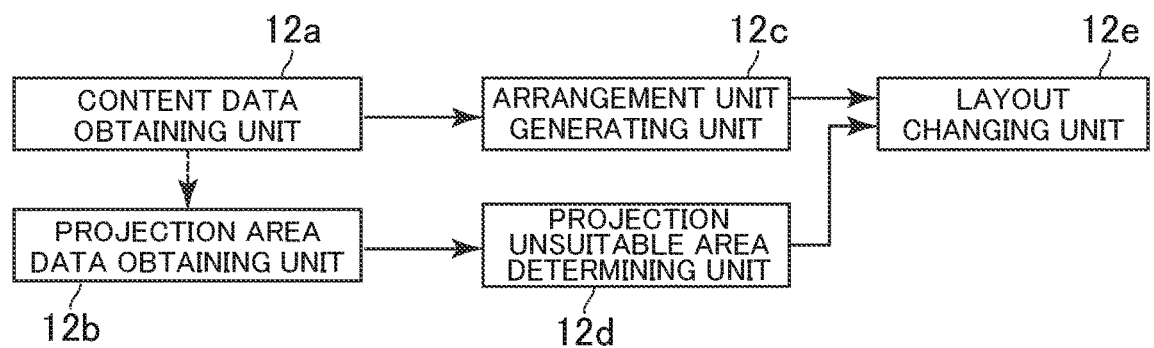
FIG. 9 is a functional block diagram of the content projection control apparatus according to an embodiment of the present invention.

Here, the information processing performed in the computer 12 will be described more in details below. FIG. 9 is a functional block diagram of the computer 12. The computer 12 functionally includes a content data obtaining unit 12a, a projection area data obtaining unit 12b, an arrangement unit generating unit 12c, a projection unsuitable area determining unit 12d, and a layout changing unit 12e. These functions are implemented when the computer 12 executes a computer program according to the embodiments of the present invention.

The content data obtaining unit 12a obtains content data indicating content. The content includes a plurality of objects, and each object includes one or more images or a plurality of characters. The projection area data obtaining unit 12b obtains projection area data indicating the projection area 40. Here, the projection area data is captured image data of the projection area 40 by the camera 16.

The projection unsuitable area determining unit 12d determines a projection unsuitable area 44 and a projection suitable area 45 in the projection area 40 based on the projection area data. As described above, the projection area determining unit 12d may determine the projection unsuitable area 44 based on the captured image of the projection area 40, on which the content indicated by the content data is projected, and the image of the content. The arrangement unit generating unit 12c generates a plurality of arrangement units each including one object or a plurality of adjacent objects from the content indicated by the content data.

The layout changing unit 12e determines a projection position of each arrangement unit based on the position of the projection unsuitable area 44, and changes the layout of the arrangement units accordingly. The layout changing unit 12e may set a priority for each arrangement unit. For example, the priority may be determined based on original projection sizes of objects included in each arrangement unit. The priority may be determined based on attributes of objects included in each arrangement unit. Further, the priority may be determined based on output history of objects included in each arrangement unit.

The layout changing unit 12e determines a projection position of each arrangement unit in accordance with a priority of each arrangement unit. At this time, the layout changing unit 12e reduces a projection size of an arrangement unit by applying a specific reduction ratio to each arrangement unit. As such, reduction ratios applied to the respective arrangement units are not always the same value.

Figure 10:
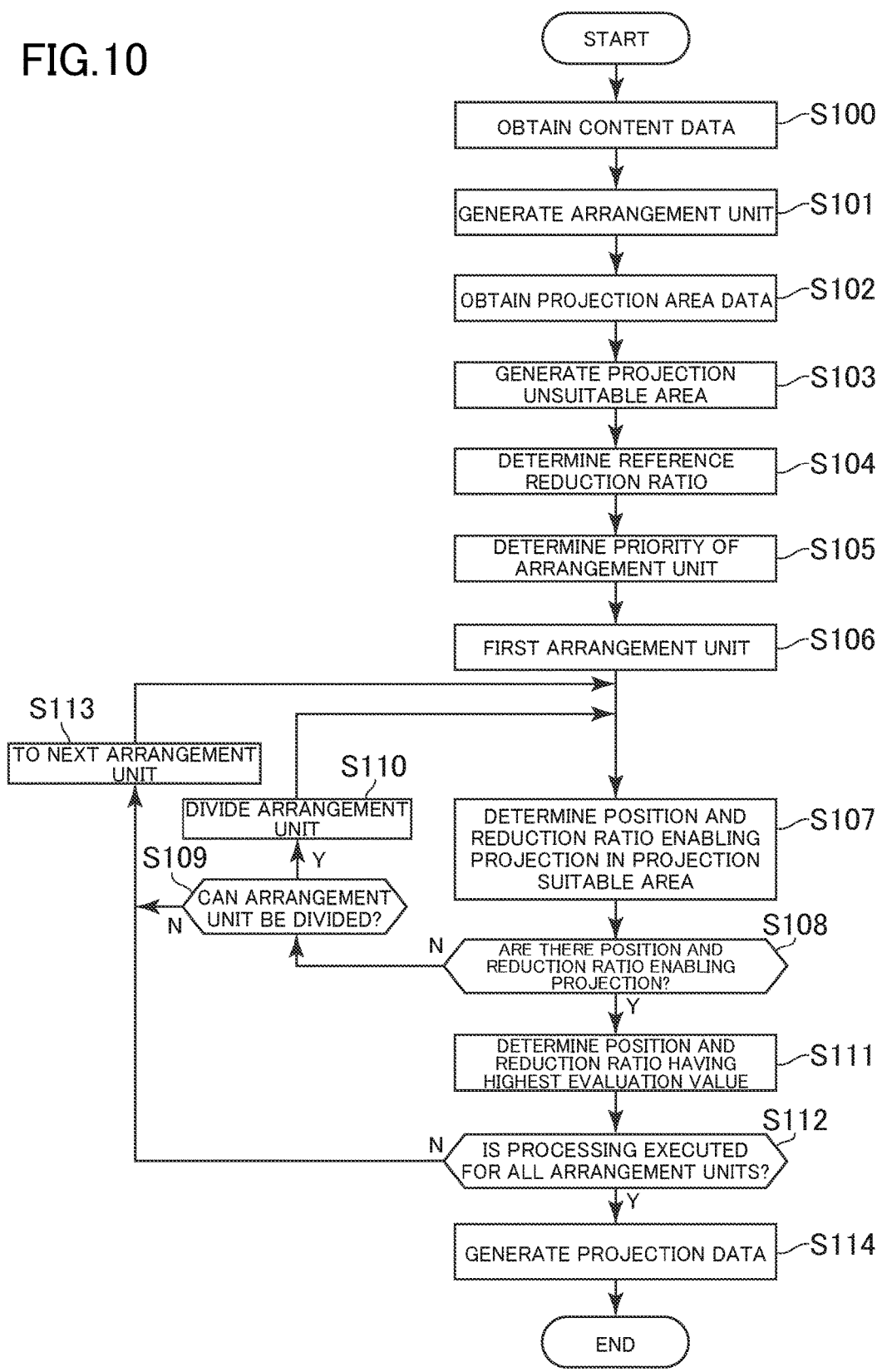
FIG. 10 is an operational flow chart of the content projection control apparatus according to an embodiment of the present invention.

FIG. 10 is an operational flow chart of the content projection control apparatus according to this embodiment. As shown in FIG. 10, the content data obtaining unit 12a of the content projection control apparatus obtains content data (S100). The content data may be received from a communication network such as the Internet, or read from storing means such as a semiconductor memory. Subsequently, the arrangement unit generating unit 12c generates arrangement units from the content data (S101). Further, the projection area data obtaining unit 12b obtains captured image data of the projection area 40 from the camera 16 (S102). The projection unsuitable area determining unit 12d determines a projection unsuitable area 44 and a projection suitable area 45 based on the captured image data (S103).

The layout changing unit 12e then determines a reference reduction ratio (S104). The reference reduction ratio may be determined based on, for example, a value obtained by dividing a size (area) of the projection suitable area 45 by a size (area) of the projection area 40. For example, the reference reduction ratio may be a value obtained by increasing the divided value by a predetermined ratio. All the arrangement units are applied with the reference reduction ratio or a reduction ratio smaller than the reference reduction ratio to be reduced. This enables more number of arrangement units to be included in a projection image as projection targets.

The layout changing unit 12e then determines a priority of each arrangement unit (S105). As described above, priorities are determined based on attributes, projection sizes, and output history of objects included in the arrangement units.

Subsequently, the layout changing unit 12e determines a projection position and a reduction ratio of each of the arrangement units (S106 to S113) in descending order of priority (S106). That is, each of the arrangement units is moved up, down, left or right in the projection suitable area 45 and applied with a plurality of reduction ratios so as to determine a position to be successfully projected and a reduction ratio at the position in the projection suitable area 45 (S107). In this regard, a reduction ratio applied to each arrangement unit is smaller than the reduction ratio determined in S104. That is, each arrangement unit is reduced to the same as or smaller than the size in a case where the reduction ratio determined in S104 is applied. The reduction ratio has a predetermined limiting value, and cannot be a value smaller than the limiting value. This prevents reducing an arrangement unit to such an extent that content is not readable.

Figure 11:
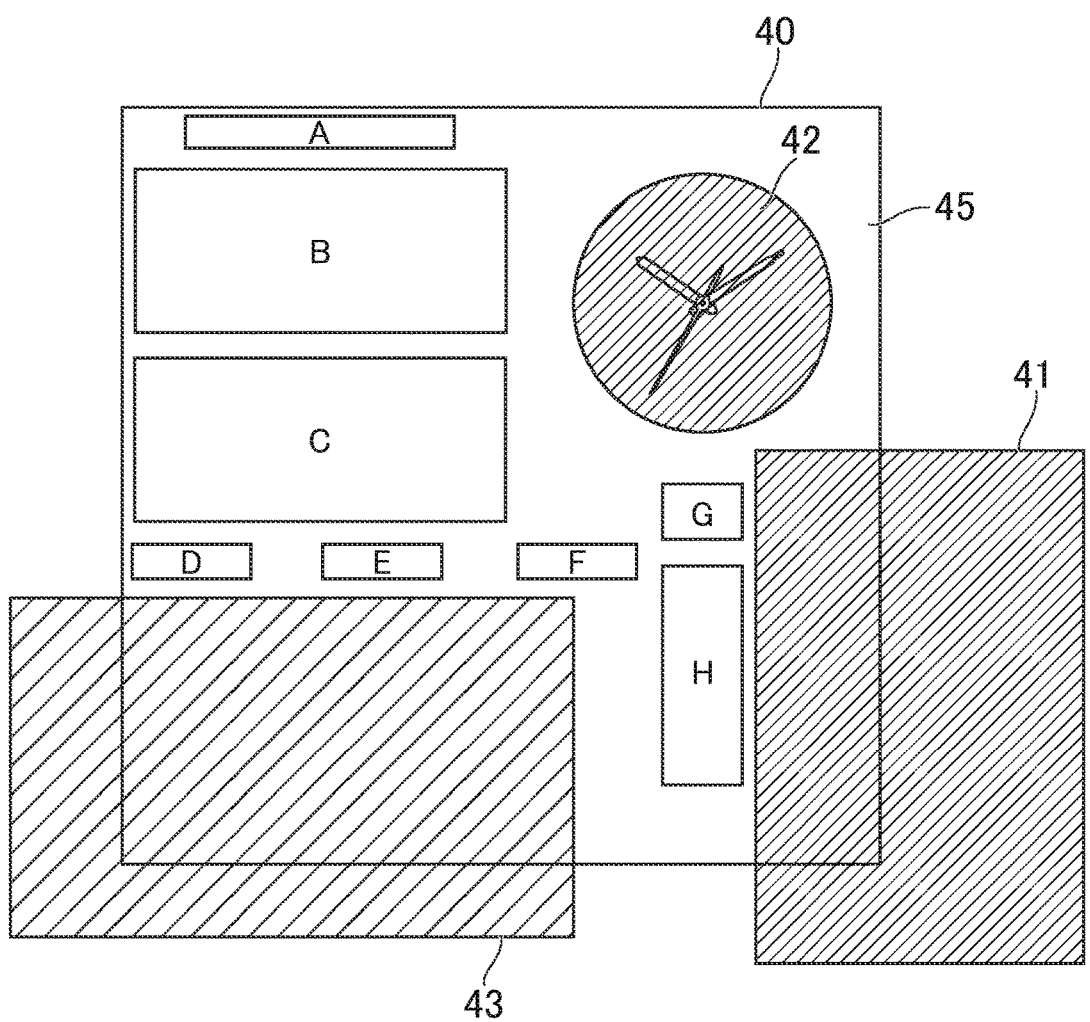
FIG. 11 is a diagram illustrating another example of a layout change by the content projection control apparatus according to an embodiment of the present invention.

If there are positions and reduction ratios that allow an arrangement unit to be successfully projected on the projection suitable area 45 (S108), the projection position and the reduction ratio having the highest arrangement evaluation value E described above are determined (S111). If there are no position and no reduction ratio that allow an arrangement unit to be successfully projected on the projection suitable area 45 (S108), the arrangement unit is further divided as shown in FIG. 6 (S110), and then S107 and subsequent processing is executed. At this time, if an arrangement unit does not include a plurality of objects as the arrangement units 21 and 25 (S109), the arrangement unit is not projected, and a projection position and a reduction ratio of an arrangement unit having the next highest priority are determined (S113). The above processing will be executed for all of the arrangement units (S112). FIG. 11 is a diagram illustrating an example of projection where a projection unsuitable area spreads in the lower right and the lower left of the projection area 40 due to existence of equipment 41 and 43, such as a calendar. In the example of FIG. 11, there are no position and no reduction ratio that allow the arrangement units I and J to be successfully projected, and thus these arrangement units are not projected.

Subsequently, the layout changing unit 12e reduces the arrangement units using the respective reduction ratios determined in S111, and places the arrangement units at the projection positions determined in S111, thereby generating a projection image in which the layout of content has been changed (S114). This projection image is projected by the projector 14 on the wall 18, and the image shown in FIG. 4 then appears on the wall.

According to the content projection control apparatus described above, the plurality of arrangement units 21 to 25 are generated from the content 20. Each of the arrangement units 21 to 25 includes one object or a plurality of adjacent objects. The layout changing unit 12e determines a projection position of each arrangement unit based on the positions of the projection unsuitable area 44 and the projection suitable area 45. As such, while effectively utilizing the projection suitable area 45, it is possible to prevent visibility of content from being partially lowered due to existence of the projection unsuitable area.

Figure 12:
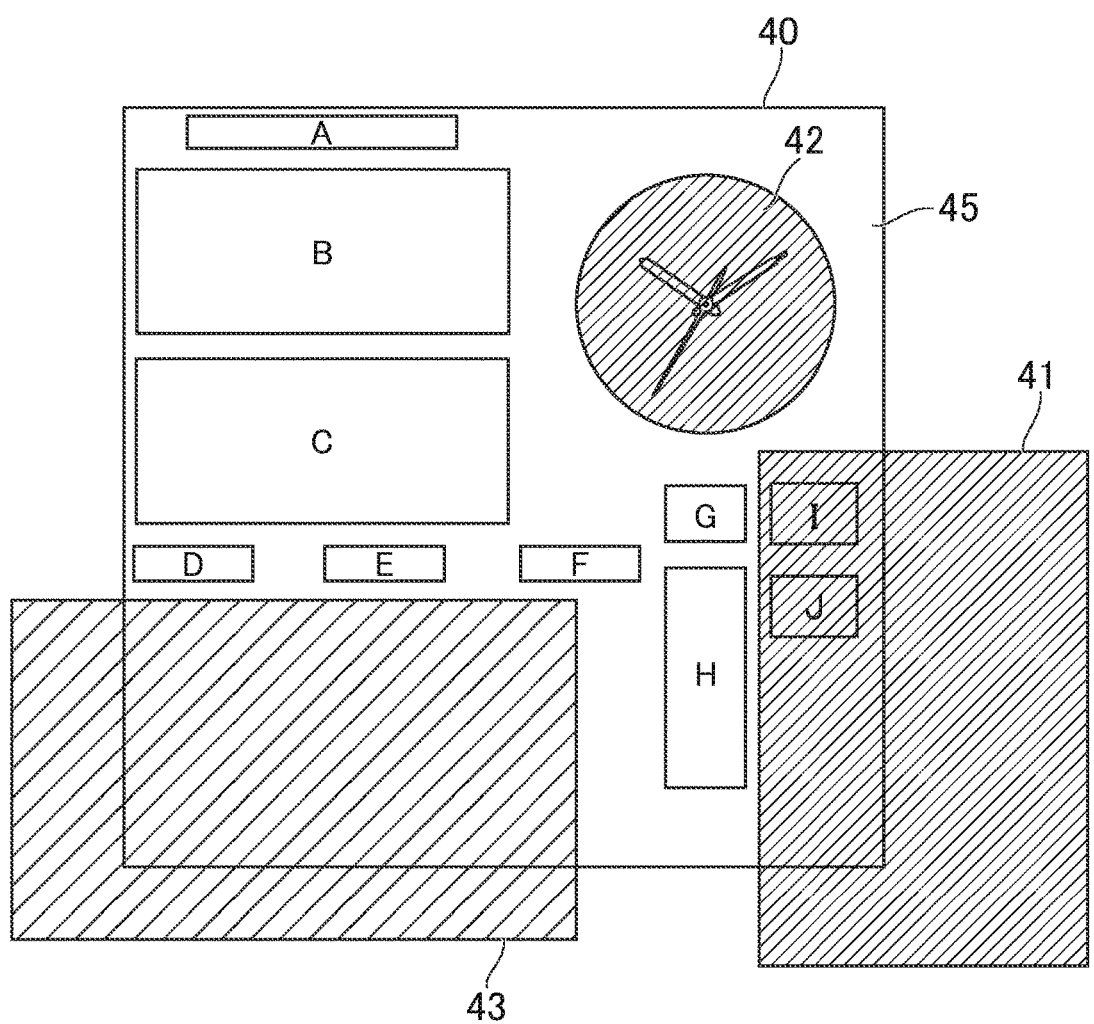
FIG. 12 is a diagram illustrating still another example of a layout change by the content projection control apparatus according to an embodiment of the present invention.

The present invention is not limited to the above described embodiments and may be modified in various manners. For example, the layout changing unit 12e may place an arrangement unit having a low priority in the projection unsuitable area 44. FIG. 12 is a diagram illustrating the arrangement units 25c (object I) and 25d (object J) arranged in the projection unsuitable area (lower right of the projection area 40) generated due to existence of the equipment 41, such as a calendar. In this way, it is possible to avoid a situation where an arrangement unit having a low priority is never projected.

Figure 13:
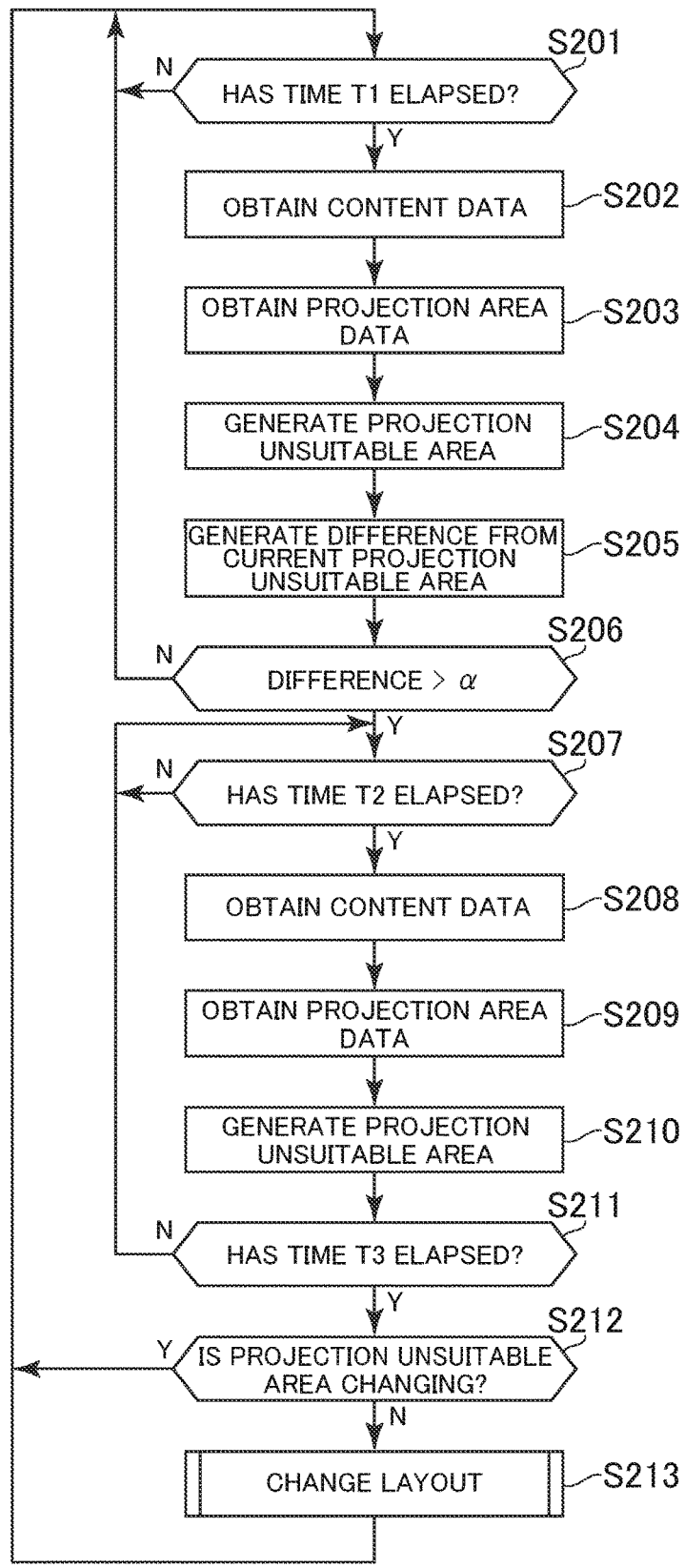
FIG. 13 is an operational flow chart of the content projection control apparatus for changing a layout at any time according to changes in the projection unsuitable area.

While it is assumed in the foregoing description that the projection unsuitable area 44 and the projection suitable area 45 are not changed, the present invention may also be applied to a case where the projection unsuitable area 44 and the projection suitable area 45 are changed. FIG. 13 is an operational flowchart of the content projection control apparatus for changing a layout according to changes in the projection unsuitable area 44 and the projection suitable area 45. Long-period monitoring operations are performed in S201 to S206, and short-period monitoring operations are performed in S207 to S212.

As shown in FIG. 13, the content projection control apparatus waits for the time when time T1 has elapsed since the previous layout change (S201). When the time T1 has elapsed, the content projection control apparatus obtains the content data currently projected (S202), and also obtains the captured image data of the projection area 40 on which the content is currently projected (S203). Then a projection unsuitable area 44 is determined based on the data obtained in S202 and S203 (S204). For example, edge extracting process is performed on content images indicated by the content data, and also edge extracting process is performed on the captured image of the projection area 40. Subsequently, the projection area 40 is divided into a plurality of block areas, and, for each block area, a difference between the processed captured image and the processed content image is calculated. A block area in which a difference is a threshold value or more is determined as a projection unsuitable area 44, and a block area in which a difference is less than the threshold value is determined as a projection suitable area 45.

Subsequently, a difference between the projection unsuitable area 44 generated in S204 and the projection unsuitable area 44 generated immediately before S204, on which the layout change of the current content is based, is calculated (S205). If the difference is equal to or less than the threshold value α, the processing returns to S201.

On the other hand, if the difference of the projection unsuitable area 44 is more than the threshold value α, the long-period monitoring operations are finished, and the short-period monitoring operations are initiated. That is, it is determined whether time T2 has elapsed since the last time a projection unsuitable area 44 is generated (more recent time between the time when S204 is executed and the time when S210 is executed) (S207). The time T2 is preferably much shorter than the time T1 and, more specifically, the time T1 is preferably more than several times longer than the time T2.

If the time T2 has elapsed since the last time a projection unsuitable area 44 is generated, the content data currently projected is obtained (S208), and the captured image data of the projection area 40 on which the content is currently projected is further obtained (S209). Then a projection unsuitable area 44 is determined based on the data obtained in S208 and S209 (S210).

Subsequently, it is determined whether time T3 has elapsed since the last time the projection unsuitable area 44 is generated in S204, i.e. the time when the long-period monitoring operations are finished (S211). The time T3 is preferably several times longer than the time T2 and shorter than the time T1. If the time T3 has not elapsed, the processing returns to S207.

If the time T3 has elapsed, it is determined whether the projection unsuitable area 44 is currently changing (S212). For example, two projection unsuitable areas 44 are extracted from all of the projection unsuitable areas 44 generated in the immediately previous time T3, and a difference between the two projection unsuitable areas 44 is calculated. A difference is calculated for every combination of projection unsuitable areas 44, and if all of the combinations have less than the predetermined threshold value, it is determined that the projection unsuitable area 44 is not currently changing. If the projection unsuitable area 44 is currently changing, the processing returns to S201. If the projection unsuitable area 44 is not currently changing, the layout changing process shown in FIG. 10 is performed again (S213).

According to the process described above, the layout is not rearranged by a dynamic change, such as a person or a beam of a laser pointer passing by in front of the projection area 40, in the projection unsuitable area 44. As such, it is possible to prevent the layout from being frequently and repeatedly rearranged. Further, as described above, the long-period monitoring operations and the short-period monitoring operations are combined, and thus it is possible to minimize process of generating the projection unsuitable area 44 (S204) by the long-period monitoring operations, and to rapidly detect a static (fixed) change in the projection unsuitable area 44 by the short-period monitoring operations.

The invention claimed is:

1. A content projection control apparatus comprising:
a central processing unit; and
a memory storing a program which causes the central processing unit to:
obtain content data indicating content including a plurality of objects, each object including one or more images or a plurality of characters;
obtain projection area data indicating a projection area;
determine a projection unsuitable area, which is not suitable for projection in the projection area, and a projection suitable area, which is suitable for projection in the projection area, based on the projection area data;
generate a plurality of arrangement units from the content indicated by the content data, each arrangement unit including one object or a plurality of adjacent objects;
determine a reference reduction ratio based on a size of the projection area and a size of the projection suitable area; and
reduce a projection size of each arrangement unit by applying a specific reduction ratio determined based on the reference reduction ratio to each arrangement unit, and changing a layout of the arrangement units by determining a projection position of each arrangement unit based on a position of the projection unsuitable area.

2. The content projection control apparatus according to claim 1, wherein the memory storing a program further causes the central processing unit to determine the projection unsuitable area based on a captured image of the projection area on which the content indicated by the content data is projected and an image of the content.

3. The content projection control apparatus according to claim 1, wherein the memory storing a program further causes the central processing unit to set a priority of each arrangement unit.

4. The content projection control apparatus according to claim 3, wherein the memory storing a program further causes the central processing unit to determine a priority of each arrangement unit based on a projection size of each object included in each arrangement unit.

5. The content projection control apparatus according to claim 3, wherein the memory storing a program further causes the central processing unit to determine a priority of each arrangement unit based on an attribute of each object included in each arrangement unit.

6. The content projection control apparatus according to claim 3, wherein the memory storing a program further causes the central processing unit to determine a priority of each arrangement unit based on an output history of each object included in each arrangement unit.

7. The content projection control apparatus according to claim 3, wherein the memory storing a program further causes the central processing unit to determine a projection position of each arrangement unit according to the priority.

8. The content projection control apparatus according to claim 7, wherein the memory storing a program further causes the central processing unit to place the arrangement units on the projection unsuitable area, the arrangement units being selected based on the priority.

9. The content projection control apparatus according to claim 1, wherein the memory storing a program further causes the central processing unit to change the layout of the arrangement units according to a change of the projection unsuitable area in the projection area.

10. A non-transitory computer readable medium causing a computer to:
obtain content data indicating content including a plurality of objects, each object including one or more images or a plurality of characters;
obtain projection area data indicating a projection area;
determine a projection unsuitable area, which is not suitable for projection in the projection area, and a projection suitable area, which is suitable for projection in the projection area, based on the projection area data;
generate a plurality of arrangement units from the content indicated by the content data, each arrangement unit including one object or a plurality of adjacent objects;
determine a reference reduction ratio based on a size of the projection area and a size of the projection suitable area; and
reduce a projection size of each arrangement unit by applying a specific reduction ratio determined based on the reference reduction ratio to each arrangement unit, and changing a layout of the arrangement units by determining a projection position of each arrangement unit based on a position of the projection unsuitable area.

11. A content projection control method comprising:
obtaining content data indicating content including a plurality of objects, each object including one or more images or a plurality of characters;
obtaining projection area data indicating a projection area;
determining a projection unsuitable area, which is not suitable for projection in the projection area, and a projection suitable area, which is suitable for projection in the projection area, based on the projection area data;
generating a plurality of arrangement units from the content indicated by the content data, each arrangement unit including one object or a plurality of adjacent objects;
determining a reference reduction ratio based on a size of the projection area and a size of the projection suitable area;
reducing a projection size of each arrangement unit by applying a specific reduction ratio determined based on the reference reduction ratio to each arrangement unit, and
changing a layout of the arrangement units by determining a projection position of each arrangement unit based on a position of the projection unsuitable area.

\* \* \* \* \*